No. 688,894. Patented Dec. 17, 1901.
C. G. STREICH, Jr.
FRONT GEAR FOR VEHICLES.
(Application filed Mar. 23, 1901.)
(No Model.) 2 Sheets—Sheet 1.

Witnesses. Inventor.
Charles G. Streich, Jr.
By Benedict & Morsell.
Attorneys.

No. 688,894. Patented Dec. 17, 1901.
C. G. STREICH, Jr.
FRONT GEAR FOR VEHICLES.
(Application filed Mar. 23, 1901.)
(No Model.) 2 Sheets—Sheet 2.

Witnesses.
C. H. Keeney,
Anna V. Faust.

Inventor.
Charles G. Streich, Jr.
By Benedict & Morsell
Attorneys.

THE NORRIS PETERS CO., PHOTO-LITHO., WASHINGTON, D. C.

UNITED STATES PATENT OFFICE.

CHARLES G. STREICH, JR., OF OSHKOSH, WISCONSIN.

FRONT GEAR FOR VEHICLES.

SPECIFICATION forming part of Letters Patent No. 688,894, dated December 17, 1901.

Application filed March 23, 1901. Serial No. 52,646. (No model.)

*To all whom it may concern:*

Be it known that I, CHARLES G. STREICH, Jr., residing at Oshkosh, in the county of Winnebago and State of Wisconsin, have invented a new and useful Improvement in Front Gears for Vehicles, of which the following is a description, reference being had to the accompanying drawings, which are a part of this specification.

My invention has relation to improvements in front gears for vehicles.

One of the objects of the invention is to provide an improved form of evener whereby when one of the wheels of the vehicle strikes an obstruction in the road-bed or passes down into a rut the pulling power necessary to release said wheel from the obstruction or rut is distributed equally among all the animals.

A further object is to provide an improved form of boxes in which the thills or poles are secured of such construction as to form a part of the gearing or frame of the vehicle, whereby boxes may be provided which are sufficiently large and are at the same time disposed at a point sufficiently low to permit the wagon to be turned without danger of any part of the vehicle, such as the circle-raisers, striking said boxes.

A further object is to provide for relieving the coupling-pins which secure the poles from all the strain when the animals are backed.

With the above and other incidental objects in view the invention consists of the devices and parts or their equivalents, as hereinafter set forth.

Figure 1:
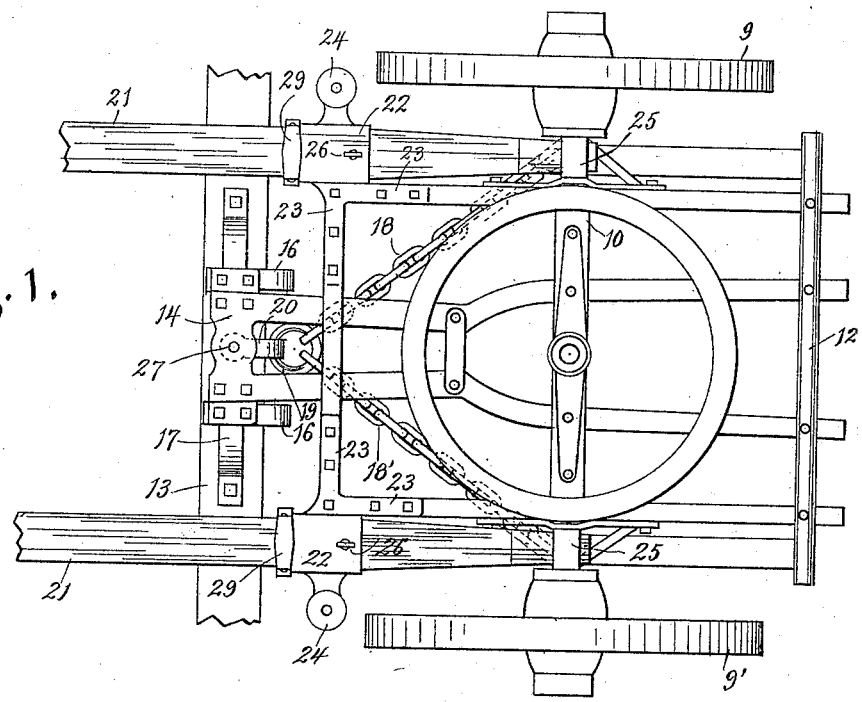
Figure 2:
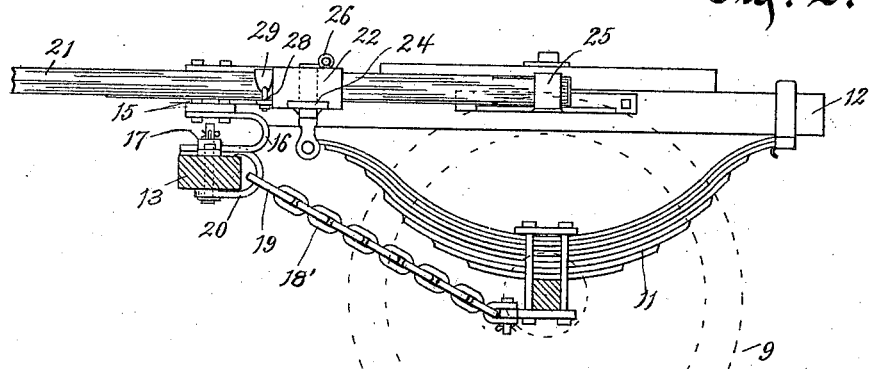
Figure 4:
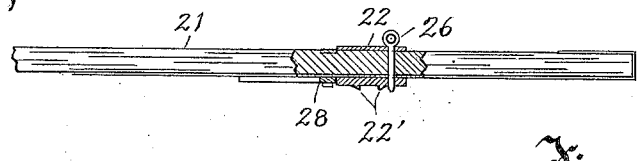
Figure 5:
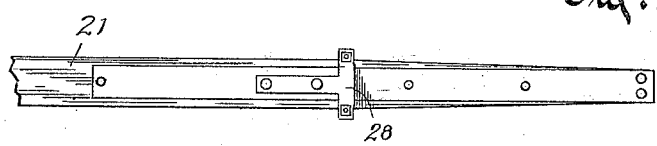
Figure 6:
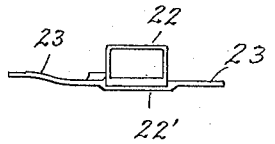
Figure 3:
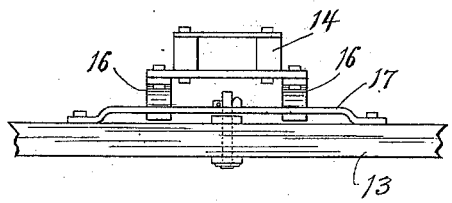

In the accompanying drawings, Figure 1 is a plan view of a front gear for vehicles embodying my improvements. Fig. 2 is a side view, the evener and axle being in section and showing one of the wheels in dotted lines. Fig. 3 is a detail view of a fragment of the evener. Fig. 4 is a detail view of one of the poles, the box therefor being in section. Fig. 5 is an under view of Fig. 4, and Fig. 6 is a detail view of one of the boxes.

Referring to the drawings, the numerals 9 9' indicate the front wheels, 10 the axle, 11 the spring, and 12 the main portion of the frame, of the front gear.

The numeral 13 indicates a slidable evener which is adapted to be movably supported from a fixed portion of the frame, so as to be capable of a sliding movement in a direction transversely of the vehicle. Any desirable means for sliding or supporting said evener may be adopted; but I prefer to employ the particular form of supporting means now about to be described. From an intermediate point of the frame 12 project forwardly the hounds 14, and to the under side of these hounds is bolted a plate 15, and to the under side of this plate and extending downwardly therefrom are two U-shaped straps 16 16, the bends of each U pointing rearwardly. While I have shown two of these straps, yet only one may be employed or more than two, as desired. If only one is used, it is desirable that the strap should have considerable width. On the upper side of the evener is a guide-bar 17, which is raised a slight distance above the surface of the evener, excepting the ends thereof, which ends are bent downwardly and bolted to the evener. The lower legs of the U-shaped straps 16 fit in the space between this guide-bar and the evener and are free to slide in said space.

The numerals 18 18' indicate the draft-chains or other suitable connecting devices. The forward ends of these chains are connected to a ring 19 and the ring in turn connected to a clevis 20, which clevis straddles the evener and is bolted thereto at a central point. The chains diverge from the ring 19, and their rear ends are connected to the axle 10, the connecting-points being near the wheels.

The gearing illustrated in Fig. 1 is designed for the attachment thereto of three horses, and the evener therefore in such form would have three whiffletrees (not shown) connected thereto, the intermediate whiffletree being connected to the evener at a point between the two poles or thills 21 21 and the outer whiffletrees to the evener at points beyond the outer sides of the poles or thills, so as to position the central horse between the poles and the outside horses outside of said poles. In the operation of this portion of my invention should one of the wheels of the vehicle strike an obstruction in the road-bed or pass into a rut the major portion of the strain will not be thrown on the animal on that side of the vehicle so obstructed, but the draft or strain will be equally distributed on all the horses, and this by reason of the capability of the evener to slide and also to move backward and forward, as well as to swing in a horizontal plane, with the least possible retardation. For instance, if the wheel 9 should strike an obstruction or pass into a rut the chain on the obstructed side of the vehicle will become tight or practically rigid, while the other chain will become slack, and with the continued pull of the animals from the evener 13 said evener will slide in a transverse direction away from the obstructed wheel, and thereby all the draft will be exerted directly from said obstructed wheel, and when the wheel is passing over the obstruction or out of the rut the opposite chain, which was before loose, immediately becomes tight and the chain which was before tight becomes slack, while the evener slides in the opposite direction to that first explained, whereby whipping of the pole is entirely avoided. Of course if the wheel 9' becomes obstructed the reverse operation takes place.

Besides the equalization and distribution of the pull of the horses my improved construction prevents the poles or thills from striking the animals by reason of sidewise sway or whipping of the poles, which is now such a common source of annoyance to the animals, and also prevents the breakage of poles.

My construction, furthermore, permits the vehicle to be driven without the necessity of using a pole or tongue, neck-yokes, or pole-chains, thereby taking the strain off the horses' necks.

While the specific form of straps 16 are the preferred devices for slidingly supporting the evener 13, yet, as previously stated, I do not wish to be understood as limiting myself to such specific construction, inasmuch as various modifications could be resorted to for permitting the same sliding movement of the evener.

My invention also includes means for attaching the thills or poles. This consists in providing boxes 22 22. These boxes have extending from their inner sides the arms 23 23, the arms of each set projecting at right angles to each other and one arm of each set being secured to a side piece of the gear and the other arm to the front piece of said gear. The arms 23 23 and the boxes form the principal part of the ironing of the front portion of the gear and do away with the old style of ironing the front portion of the gear, which old style was more complicated and expensive. For convenience the steps 24 24 of the vehicle may project laterally from the outer sides of these boxes. Located in line with and to the rear of the front boxes and secured to the sides of the frame just above the axle are sleeves 25 25. The poles or thills 21 are passed through the boxes and are thrust rearwardly to such an extent that their rear ends pass into the sleeves 25, in which sleeves they loosely fit. The poles are secured in the boxes 22, however, by means of removable pins 26, which pass through registering openings in the boxes and pole, as most clearly shown in Fig. 4. The pins are advisedly secured to the free ends of short chains, (not shown,) the other ends of said chains being secured to the poles. It will be noticed that the boxes 22 are provided on their under sides with parallel transverse lugs 22', which lugs serve to take the strain from the bolts which hold the boxes in place by reason of the fact that the outer ends of the front bar of the frame 12 extend beneath the boxes 22 and fit between these lugs. The said lugs also add to the strength of the weakest point of the gear.

In many forms of construction the rear ends of the poles are secured at points near the axle by means of bolts, and as these bolts are in a very inaccessible position it is quite difficult to effect their removal. In my improved construction the rear ends of the poles fit loosely in the sleeves 25, while the securing-pins pass through the boxes 22 at the forward portion of the gear, and hence are in position to be readily accessible. It will be seen that by providing the forward boxes with the arms 23 23, which arms are secured respectively to the forward and side bars of the gearing or frame 12, said boxes form a part of the ironing of the gear or frame of the vehicle, and by this construction I provide boxes 22 which are amply large and at the same time are disposed at a sufficiently low point to allow the wagon to turn without danger of any of the parts, such as the circle-raisers, striking such boxes. By this combination of parts I am enabled to use my invention with almost any form of wagon-gear, and I am furthermore permitted to extend the pole or thill back a considerably greater distance than has heretofore been customary, whereby the fifth-wheel and king-bolt are relieved of considerable strain. Another advantage of this manner of securing the poles resides in the fact that by the employment of the boxes 22 the necessity of using hounds similar to the hounds 14 for the opposite sides of the poles 21 is avoided. Furthermore, the boxes not only form guide-boxes at the forward portion of the gear, but actually constitute a portion of the gearing for draft purposes—that is to say, the pull is exerted from said boxes, provided a lead team is hitched to the regular horses, and at the same time the position of the boxes is such that the steps 24 may conveniently extend outwardly therefrom. This manner of securing the poles possesses the still further advantage of providing for the ready converting of the vehicle from a two-horse vehicle to a three-horse vehicle, or vice versa. This only necessitates taking out the pins 22, then removing the two poles, next passing one of said poles between the side members of the hounds 14, and finally running the pin 26 through an opening 27 in the hounds 14 and through the registering opening in the pole, or vice versa. Each pole is also preferably provided on its under side with a transverse stop-bar 28, said bar advisably forming the integral head of a T-bar, the longitudinal stem of said T-bar being bolted to the pole. The outer ends of the transverse stop-bar extend laterally beyond the side edges of the pole and are secured firmly thereto by means of a clip 29. The bars 28 are so positioned as to contact with the forward edges of the under sides of the boxes 22, and by this arrangement when the animals back the strain occasioned by the backing is not entirely directed against the pins 26, but the major portion of said strain comes against said under edges of the boxes.

What I claim as my invention is—

1. The combination of a frame, an axle, wheels mounted on said axle, an evener-bar carried by the frame and constructed to have a sliding movement transversely of the frame, and draft-chains having their rear ends connected, respectively, to the front axle at points near the wheels, and their forward ends converged and connected to a central point of the evener-bar.

2. The combination of a frame, an axle, wheels mounted on said axle, an evener-bar carried by the frame and constructed to have a sliding movement transversely of the frame, and also a back-and-forth movement, and draft-chains having their rear ends connected, respectively, to the front axle at points near the wheels, and their forward ends converged and connected to a central point of the evener-bar.

3. The combination of a frame, an axle, wheels mounted on said axle, an evener-bar carried by the frame and constructed to have a sliding movement transversely of the frame, and also a horizontally-swinging movement, and draft-chains having their rear ends connected, respectively, to the front axle at points near the wheels, and their forward ends converged and connected to a central point of the evener-bar.

4. The combination of a frame, an axle, wheels mounted thereon, a U-shaped strap or straps extending downwardly from the frame, an evener-bar, a guide-bar connected to the upper side of the evener-bar in such manner as to leave a space between it and the upper side of the evener-bar, said space adapted to receive the lower legs of the U-shaped strap, and draft-chains connected at their forward ends to an intermediate point of the evener-bar, and having their rear ends connected, respectively, to the front axle at points near the wheels.

5. The combination of the frame of a vehicle, a box located at the forward portion thereof, said box provided with arms projecting at right angles thereto, one of the arms being fast to the side bar of the frame, and the other of the arms being fast to the front bar of said frame, a thill or pole adapted to be passed through the box, and means for securing said thill or pole in the box.

6. The combination of the frame of a vehicle, a box secured to the forward portion thereof, said box provided on its outer side with an outwardly-projecting step, a thill or pole adapted to be passed through the box, and a securing-pin extending through an opening in the box and through a registering opening in the thill or pole.

7. The combination of the frame of a vehicle, a box located at the forward portion thereof, said box provided with arms projecting at right angles therefrom, one of the arms being fast to the side bar of the frame, and the other of the arms being fast to the front bar of said frame, a sleeve secured to and projecting laterally from the outer side of the side bar of the frame at a distance to the rear of the box, a thill or pole passing through the box and having its rear end loosely fitting in the sleeve, and means for securing the thill or pole in the box.

8. The combination of the frame of a vehicle, the end of the front bar thereof extending laterally beyond the side bar, a box located at the forward portion of the frame, and provided upon its under side with transverse lugs, the projecting end of the front bar of the frame fitting between said lugs, a thill or pole adapted to be passed through the box, and means for securing said thill or pole in the box.

In testimony whereof I affix my signature in presence of two witnesses.

CHARLES G. STREICH, Jr.

Witnesses:
A. L. MORSELL,
ANNA V. FAUST.